United States Patent
Pankratz et al.

(10) Patent No.: US 12,437,465 B2
(45) Date of Patent: Oct. 7, 2025

(54) BOUNDING VOLUME HIERARCHY LEAF NODE COMPRESSION

(71) Applicants: Advanced Micro Devices, Inc., Santa Clara, CA (US); ATI Technologies ULC, Markham (CA)

(72) Inventors: David William John Pankratz, Markham (CA); David Ronald Oldcorn, Milton Keynes (GB); Daniel James Skinner, Milton Keynes (GB); Michael John Livesley, Milton Keynes (GB); David Kirk McAllister, Santa Clara, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 53 days.

(21) Appl. No.: 18/081,387

(22) Filed: Dec. 14, 2022

(65) Prior Publication Data
US 2024/0203032 A1    Jun. 20, 2024

(51) Int. Cl.
*G06T 15/06* (2011.01)
(52) U.S. Cl.
CPC .......... *G06T 15/06* (2013.01); *G06T 2210/12* (2013.01)
(58) Field of Classification Search
CPC ......... G06T 15/06; G06T 15/20; G06T 17/00; G06T 17/20; G06T 2210/12
See application file for complete search history.

(56) References Cited

U.S. PATENT DOCUMENTS

| | | | | |
|---|---|---|---|---|
| 2015/0062142 A1* | 3/2015 | Goel | | G06T 11/203 |
| | | | | 345/582 |
| 2018/0253867 A1* | 9/2018 | Laroche | | G06T 17/20 |
| 2018/0373839 A1* | 12/2018 | Semenyuk | | G16B 50/50 |
| 2019/0156550 A1* | 5/2019 | Stanard | | G06T 15/06 |
| 2019/0324991 A1* | 10/2019 | Lehtinen | | G06T 9/001 |
| 2021/0304484 A1 | 9/2021 | Saleh et al. | | |
| 2021/0390759 A1 | 12/2021 | Muthler et al. | | |
| 2022/0051466 A1* | 2/2022 | Doyle | | G06T 9/00 |
| 2022/0198741 A1 | 6/2022 | Viitanen et al. | | |

FOREIGN PATENT DOCUMENTS

WO    2022093583 A1    5/2022

OTHER PUBLICATIONS

Ylitie, H., et. al.,"Efficient Incoherent Ray Traversal on GPUs Through Compressed Wide BVHs", HPG '17, Los Angeles, California, 2017, 13 pgs.

* cited by examiner

*Primary Examiner* — Michelle Chin
(74) *Attorney, Agent, or Firm* — Volpe Koenig

(57) ABSTRACT

A technique for performing ray tracing operations is provided. The technique includes identifying triangles to include in a compressed triangle block; storing data common to the identified triangles as common data of the compressed triangle block; and storing data unique to the identified triangles as unique data of the compressed triangle block.

20 Claims, 6 Drawing Sheets

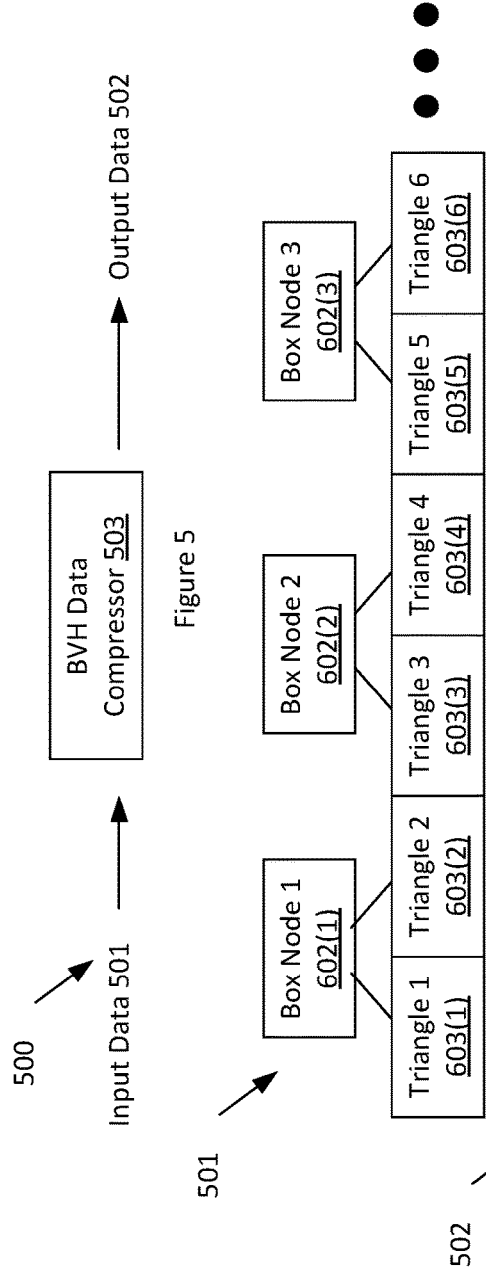
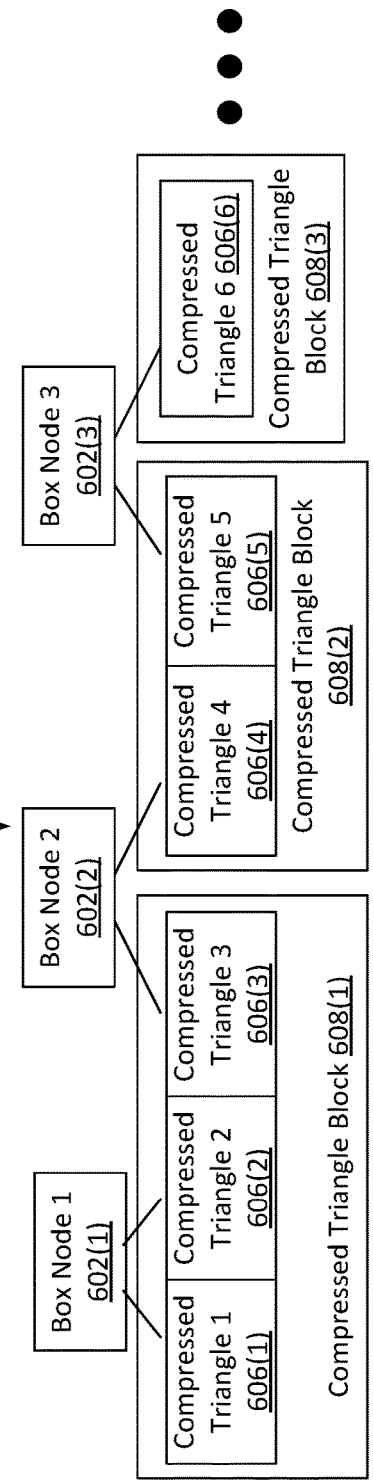
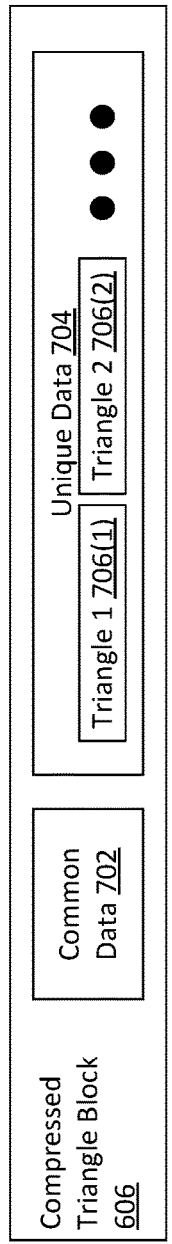
Figure 5
Figure 6
Figure 7

BOUNDING VOLUME HIERARCHY LEAF NODE COMPRESSION

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein:

FIG. 5 illustrates a system for generating a bounding volume hierarchy with compressed triangle data, according to an example;

FIG. 6 illustrates an example compression operation;

FIG. 7 illustrates an example compressed triangle block; and

DETAILED DESCRIPTION

A technique for performing ray tracing operations is provided. The technique includes identifying triangles to include in a compressed triangle block; storing data common to the identified triangles as common data of the compressed triangle block; and storing data unique to the identified triangles as unique data of the compressed triangle block.

Figure 1:
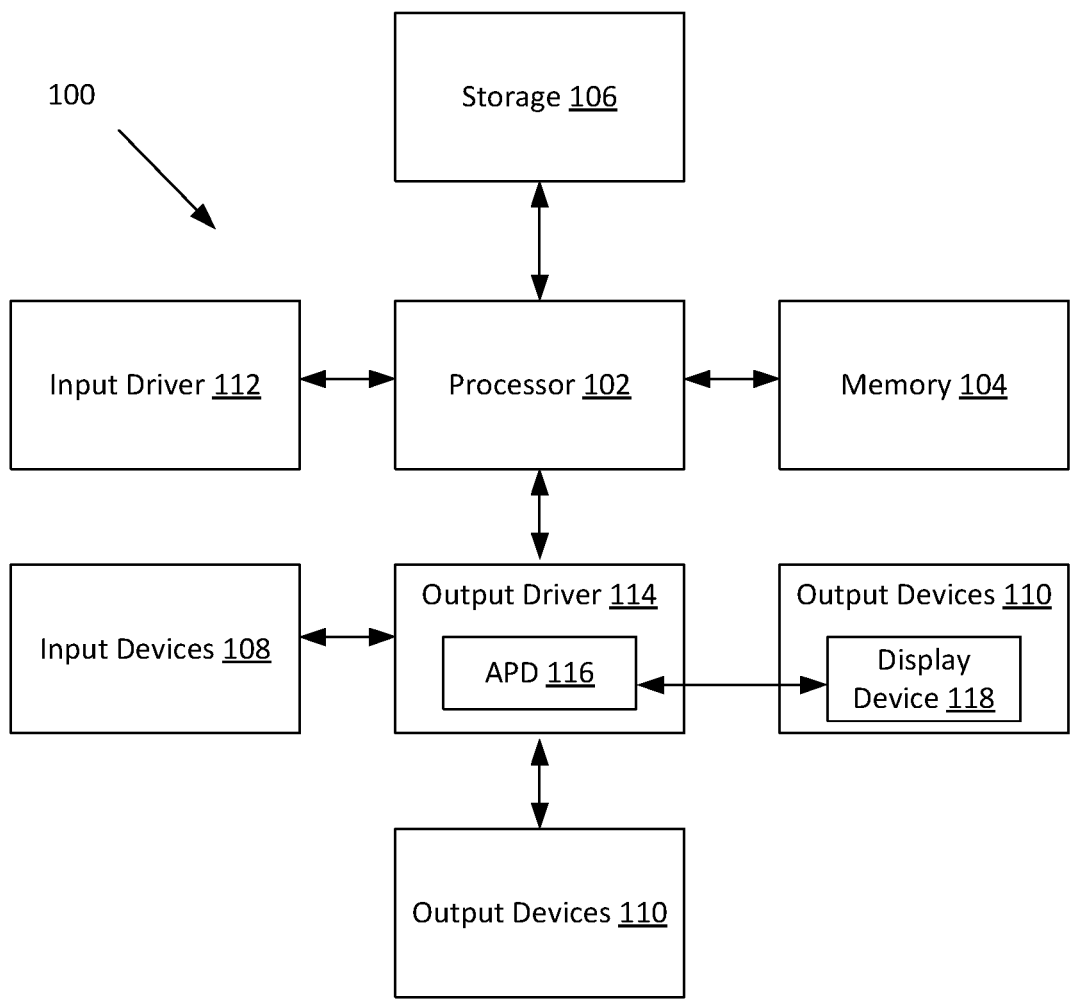
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
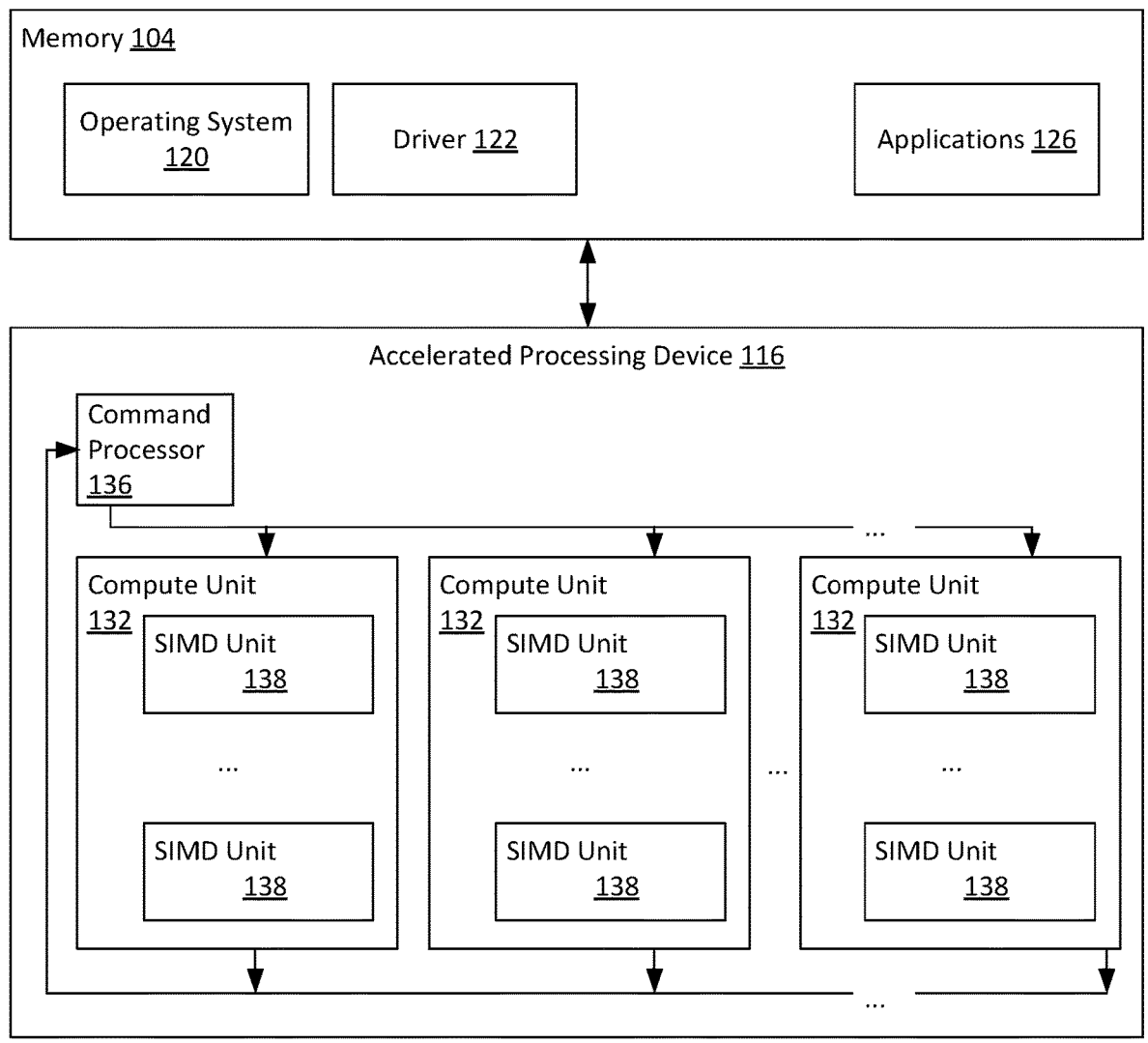
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 (together, parallel processing units 202) that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
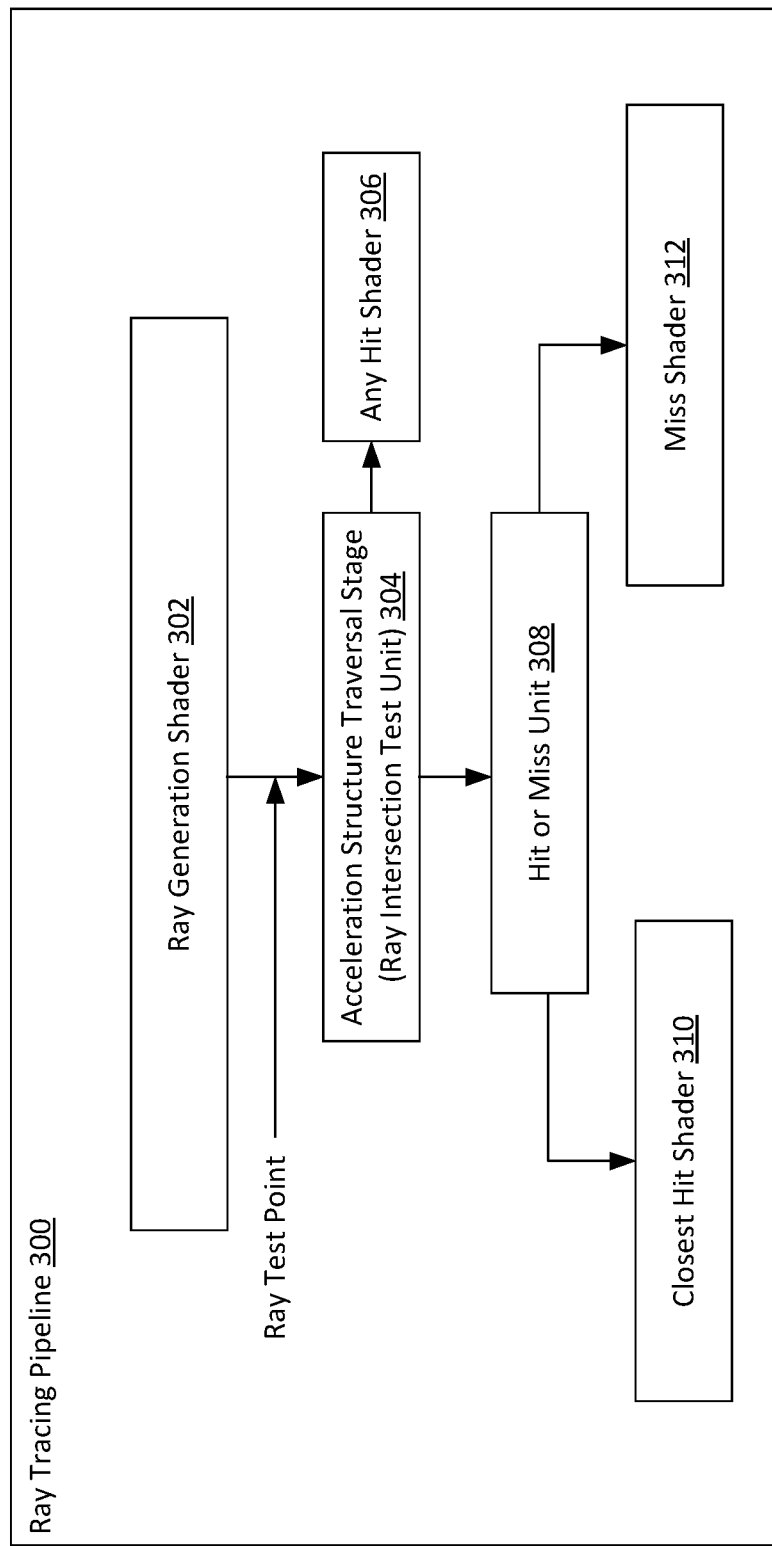
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). The acceleration structure traversal stage 304 performs a ray intersection test to determine whether a ray hits a triangle.

The various programmable shader stages (ray generation shader 302, any hit shader 306, closest hit shader 310, miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The hit or miss unit 308 is implemented in any technically feasible manner, such as as part of any of the other units, implemented as a hardware accelerated structure, or implemented as a shader program executing on the SIMD units 138. The ray tracing pipeline 300 may be orchestrated partially or fully in software or partially or fully in hardware, and may be orchestrated by the processor 102, the scheduler 136, by a combination thereof, or partially or fully by any other hardware and/or software unit. The term "ray tracing pipeline processor" used herein refers to a processor executing software to perform the operations of the ray tracing pipeline 300, hardware circuitry hard-wired to perform the operations of the ray tracing pipeline 300, or a combination of hardware and software that together perform the operations of the ray tracing pipeline 300.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The hit or miss unit 308, which, in some implementations, is part of the acceleration structure traversal stage 304, determines whether the results of the acceleration structure traversal stage 304 (which may include raw data such as barycentric coordinates and a potential time to hit) actually indicates a hit. For non-opaque triangles that are hit, the ray tracing pipeline 300 may trigger execution of an any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers execution of a closest hit shader 310 for the triangle closest to the origin of the ray that the ray hits, or, if no triangles were hit, triggers a miss shader. It is possible to use an intersection shader to determine whether a ray intersects a leaf node that is not a triangle. More specifically, an intersection shader provides a customizable way to define intersection with geometry at leaf nodes.

Note, it is possible for the any hit shader 306 or intersection shader to "reject" a hit from the ray intersection test unit 304, and thus the hit or miss unit 308 triggers execution of the miss shader 312 if no hits are found or accepted by the ray intersection test unit 304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the shader programs defined for the closest hit shader 310 and miss shader 312 may implement a wide variety of techniques for coloring pixels and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel. As described elsewhere herein, it is possible for individual rays to generate multiple samples, which each sample indicating whether the ray hits a triangle or does not hit a triangle. In an example, a ray is cast with four samples. Two such samples hit a triangle and two do not. The triangle color thus contributes only partially (for example, 50%) to the final color of the pixel, with the other portion of the color being determined based on the triangles hit by the other samples, or, if no triangles are hit, then by a miss shader. In some examples, rendering a scene involves casting at least one ray for each of a plurality of pixels of an image to obtain colors for each pixel. In some examples, multiple rays are cast for each pixel to obtain multiple colors per pixel for a multi-sample render target. In some such examples, at some later time, the multi-sample render target is compressed through color blending to obtain a single-sample image for display or further processing. While it is possible to obtain multiple samples per pixel by casting multiple rays per pixel, techniques are provided herein for obtaining multiple samples per ray so that multiple samples are obtained per pixel by casting only one ray. It is possible to perform such a task multiple times to obtain additional samples per pixel. More specifically, it is possible to cast multiple rays per pixel and to obtain multiple samples per ray such that the total number of samples obtained per pixel is the number of samples per ray multiplied by the number of rays per pixel.

It is possible for any of the closest hit shader 310 or miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle against which a ray test can be performed. It should be understood that where a first node points to a second node, the first node is considered to be the parent of the second node.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
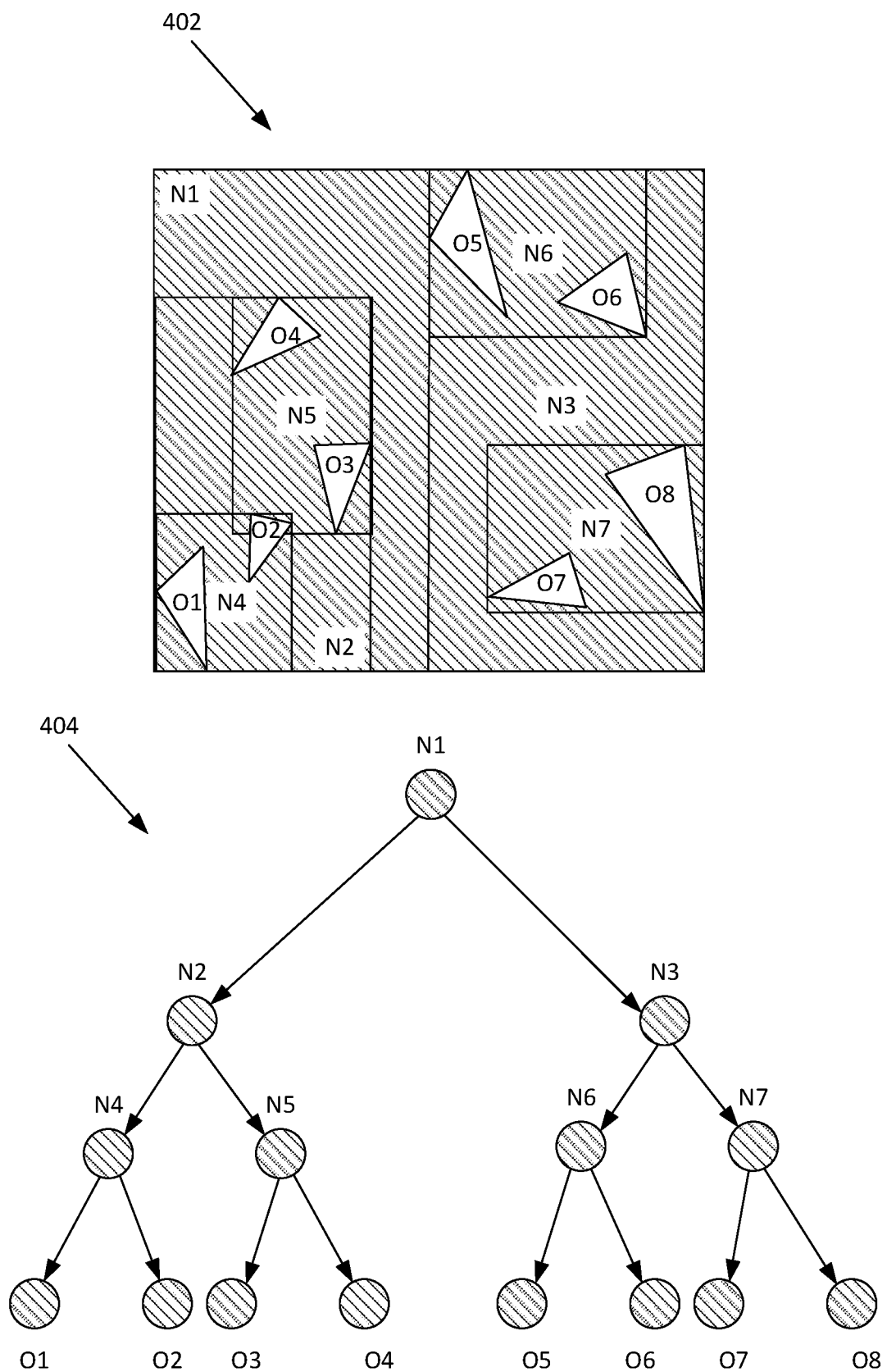
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node.

In an example, the ray intersects $O_5$ but no other triangle. The test would test against $N_1$, determining that that test succeeds. In this example, the test would test against $N_2$, determining that the test fails. The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed. Note that rays can have a variety of directions and can have an origin in a variety of locations. Thus, the specific boxes eliminated or not eliminated would depend on the origin and direction of the rays. However, in general, testing the rays for intersection with boxes eliminates some leaf nodes from consideration.

As stated above, a bounding volume hierarchy includes a number of leaf nodes (nodes "O" in FIG. 4). Data for these leaf nodes generally includes a large amount of redundant information and can thus be compressed. In an example, because triangles that share parent nodes are close together geometrically, such triangles generally include coordinates that are numerically similar. In an example, the x coordinate of triangles that are close together have an identical set of most significant bits. In another example, triangles have associated primitive identifiers or geometry identifiers that are the same or similar. A primitive identifier is an identifier that uniquely identifies a triangle and a geometry identifier is an identifier that uniquely identifies a set of triangles that define one item of geometry. Thus, triangles can be grouped together into compression units, with common primitive identifiers and/or common geometry identifiers represented once and differences from these values represented with a much smaller number of bits than the entire value. In another example, coordinates often have zeroes in their least significant bits, such as with highly discretized geometry. Thus these zeroes can be represented by single values that indicate the number of zeroes, rather than storing each of the zeroes as raw data. These techniques and others have the potential to greatly reduce the amount of data stored for a BVH.

FIG. 5 illustrates a system 500 for generating a bounding volume hierarchy with compressed triangle data, according to an example. The system 500 includes a BVH compressor 503 that accepts input data 501 and generates output data with compressed data. In various examples, the BVH compressor 503 is part of a BVH builder or is external to a BVH builder. In some examples where the BVH compressor 503 is external to a BVH builder, the BVH builder utilizes the BVH compressor 503 at some point during creation of a BVH.

The BVH compressor 503 is embodied as software executing on a processor, as hardware (e.g., circuitry such as fixed function circuitry and/or another type of circuitry), or a combination of software executing processor and hardware (e.g., a combination of software working in conjunction with fixed-function hardware). In some examples, the BVH compressor 503 accepts a bounding volume hierarchy that is already generated and compresses the triangles of that BVH to generate a BVH that includes compressed triangle data. In other examples, the BVH compressor 503 accepts triangles that have not yet been incorporated into a BVH and compresses that data. In an example, the BVH compressor 503 accepts a list of triangles that is geometrically sorted and compresses the triangles in that list to generate a list of compressed triangles.

In some examples, the BVH data compressor 503 is included in the same system as the ray tracing pipeline 300 of FIG. 3. In other examples, the BVH data compressor 503 is included in a different system. In some examples, the BVH data compressor 503 compresses triangle data for a scene that is being rendered, for example, each frame, periodically, or at various times in conjunction with rendering using ray tracing.

The BVH data compressor 503 generates compressed triangle data as output data 502 based on input triangle data 501. In some examples, the BVH data compressor 503 (or another entity) sorts the triangles prior to compressing the triangles. In some examples, the sorting includes sorting by Morton codes. A Morton code is a single value generated from the multiple coordinate values of a three-dimensional vertex. In some examples, a Morton code is generated by interleaving the bits of the coordinate values of a vertex. In an example, the Morton code for a coordinate includes the most significant bit of the x coordinate of a point followed by the most significant bit of the y coordinate of the point followed by the most significant bit of the z coordinate of the point followed by the second most significant bit of the x coordinate of the point following by the second most significant bit of the y coordinate of the point followed by the second most significant bit of the z coordinate of the point, and so on. In some examples, the number of bits in each dimensions for the Morton codes are the same and in other examples, the number of bits are different for one or all dimensions. In some examples, the Morton codes are generated for the centroids of the triangles. Since Morton codes are used, sorting based on Morton codes causes coordinates that are similar in all dimensions to be close together in sorting order, resulting in a relatively large amount of common data in the most significant bits. The BVH data compressor 503 generates compressed triangle blocks by identifying triangles that should be grouped together into such blocks, identifying common data for such triangles, and storing the common data and unique data as compressed triangle blocks. Additional detail is now provided FIG. 6 illustrates an example compression operation. In this example, a BVH data compressor 503 compresses triangles 603 of input data 501 and generates compressed triangle blocks 608 that include compressed triangles 606. Although the triangles 603 are shown as part of a BVH prior to being received by the BVH data compressor 503 in FIG. 6, it is possible for the BVH data compressor 503 to compress triangle data before or at least partially in parallel with generation of a BVH for those triangles.

The compression operation includes grouping the triangles 603 into compressed triangle blocks 608. The BVH data compressor 503 generates the compressed triangle blocks 608 by identifying triangles 603 to be grouped together into the compressed triangle blocks 608, and storing common and unique data for each compressed triangle block 608. It is possible for the BVH data compressor 503 to identify which triangles 603 to include together in compressed triangle blocks 608 in any technically feasible manner. In some examples, the compressed triangle blocks 608 have a maximum size. In such examples, the BVH data compressor 503 limits the number of triangles to be included 3 in each compressed triangle block 608 to not exceed that maximum size.

Each generated compressed triangle blocks 608 include triangles that are pointed to by one or more box nodes 602. In other words, there is not necessarily a direct correspondence between the manner in which triangles are contained within a box node 602 and the manner in which triangles 606 are compressed into a compressed triangle block 608. In the example of FIG. 6, box node 1 602(1) has child compressed triangle 1 606(1) and has child compressed triangle 2 606(2), which are part of compressed triangle block 608(1). Box node 2 602(2) has child compressed triangle 3 606(3) and has compressed triangle 4 606(4). Compressed triangle 3 606(3) is part of a different compressed triangle block 608(1) than compressed triangle 4 606(4), which is part of compressed triangle block 608(2). Thus it can be seen that box node 2 602(2) has child nodes that are part of different compressed triangle blocks 608. Additionally, compressed triangle block 608(1) has compressed triangles 606 that are children of different box nodes 602. As can be seen, the BVH data compressor 503 generates compressed triangle blocks 608 from triangles 603 without reference to the location of the triangles 603 within a BVH, since compressed triangle blocks 606 can contain compressed triangles that are children of different box nodes 602, and since box nodes 602 can have children that are within different compressed triangle blocks 608.

FIG. 7 illustrates an example compressed triangle block 606. The compressed triangle block 606 includes common data 702 and unique data 704. The common data includes data that is common to all compressed triangles 606 of the compressed triangle block 606. The unique data 704 includes data that is unique to each triangle, such as unique data for triangle 1 706(1), unique data for triangle 2 706(2), and so on. The data stored in the common data 702 and the unique data 704 depends on the specific compression techniques used. Several compression techniques are now described.

In a common prefix deduplication technique, the BVH data compressor 503 identifies common prefixes for each of the triangles 606 in a compressed triangle block 608. The BVH data compressor 503 stores the common prefix in the common data 702, with unique data required for reconstruction for each triangle stored in the unique data 704. A prefix is a set of most significant bits for the triangles 706. In some examples, the BVH data compressor 503 includes a prefix for each coordinate axis (e.g., x, y, z), on the basis that the coordinate values of the vertices of the triangles on each axis may be similar. In summary, the BVH data compressor 503 applies compression for the common prefix deduplication technique by, for each axis, determining a common prefix among all vertices of all triangles of a compressed triangle block 606. The BVH data compressor 503 stores, in the common data 702, each such common prefix. The BVH data compressor 503 also stores, as unique data, other data for each triangle 706 that is required for decompression. Note that this unique data does not necessarily include all data other than the prefix because the BVH data compressor 503 may apply additional compression techniques to that data. Regarding decompression, a decompressor (e.g., an acceleration structure traversal stage 304) generates a decompressed coordinate value by combining the common prefix data with the decompressed other data for the coordinate value.

It is possible for the common prefix size to vary between compressed triangle blocks 608. It is also possible to store multiple prefixes in a single compressed triangle block 608, along with an indication for each triangle 706, of which prefix is used for that triangle 706. In some implementations, a second prefix is not explicitly stored, but a single bit or an otherwise short value is stored to indicate whether to increment the stored common prefix by one. This single additional bit provides some additional precision for the stored common prefix and allows for the flexibility of storage of prefixes, such as where the values in a compressed triangle block 608 span the origin and thus vary between a small negative number and a small positive number. Since positive and negative numbers have different prefixes, but a positive number can be reconstructed by adding a small increment to a negative number, adding this additional bit allows for representation of both positive and negative values in a compressed triangle block 608. Decompressing a compressed triangle block 608 including this additional increment bit includes modifying the prefix as indicated by the increment bit (e.g., either incrementing or not incrementing, based on the value of the increment), and combining the resulting value with the other information derived form the unique data 704 and other common data 702.

In a trailing zero deduplication technique, the BVH data compressor 503 stores, for each coordinate axis value for each vertex of each triangle, a number indicating how many zeroes are included at the trailing end (least significant bits) of the coordinate axis value. For example, for a first vertex of a first triangle, the BVH data compressor 503 stores that the x coordinate has 5 trailing zeroes, that the y coordinate has 7 trailing zeroes, and that the z coordinate has 6 trailing zeroes. The BVH data compressor 503 includes this information in the unique triangle data 706 for each triangle. A decompressor decompresses this information by combining the specified number of zeroes to the end of the value decompressed based on the common data 702, and other unique data 704 for the triangle, and based on the compression techniques used.

Another technique is a technique for compression of primitive identifier ("primitive ID") and geometry identifier ("geometry ID"). A primitive ID is an identifier that is uniquely associated with a primitive (triangle). A geometry ID is an identifier that is uniquely associated with an item of geometry. An item of geometry is a geometry shape made up of one or more primitives. In some examples, each primitive (e.g., triangle) has a primitive ID and a geometry ID. In some examples, the sorted list of triangles 602 on which the compression is applied has a consecutive set of primitive IDs and geometry IDs. More specifically, the list is sorted according to a certain parameter, and in the sorting order of the list, the primitive IDs and geometry IDs are also effectively sorted. Thus, in any given compressed triangle block 608, the primitive IDs are consecutive and monotically increasing. Vertices of the same triangle have the same primitive ID and consecutive triangles in the sorted list have the same or very close geometry IDs. In an example, in compressed triangle block 608(1), compressed triangle 1 606(1) and compressed triangle 2 606(2) have the same geometry ID and compressed triangle 3 606(3) has a geometry ID that is one after that of compressed triangle 2 606(2). The compression technique related to primitive ID and geometry ID is to store a base primitive ID and a base geometry ID in the common data 702 and, in each unique triangle data 706, to store the offset from the base. The offset for a particular triangle 706 is the value that, when added to the base in the common data 702, results in the primitive ID or geometry ID for that particular triangle 706. In some examples, the offset is not stored for the first triangle 706 in a compressed triangle block 606, because it is implicit that the base primitive ID and base geometry ID is the primitive ID and geometry ID for that triangle. Decompressing primitive ID and geometry ID information for a triangle represented by a compressed triangle block 606 includes adding the offset associated with a triangle 706 to the base for the compressed triangle block 606 associated with the triangle 706. Primitive ID and geometry ID information is used by the ray tracing pipeline 300 to perform rendering. In an example, the primitive ID indicates which material to apply to a surface.

In another example technique, the BVH data compressor 503 compresses "midfixes" of the coordinate values of the triangles. A midfix is a portion subsequent to a prefix (most significant bits) but before the final values. In a similar manner with deduplication of prefixes, the BVH data compressor 503, in some examples, stores a common midfix into the common data 702 that is common to all coordinate values sharing an axis (for example, all x values) of the triangles 606 in a compressed triangle block 606. Decompression for such technique would include generating a coordinate value for a particular vertex and axis having the common midfix stored in the common data 702. In some examples, the BVH data compressor 503 utilizes the described deduplication technique to deduplicate any data for a triangle. In such examples, the BVH data compressor 503 stores identical portions of data having identical portions for each triangle of a compressed triangle block 608 in the common data 702. A decompressor restores the data for the triangles by combining the common data with other data generated by the decompression process.

In some examples, the BVH data compressor 503 stores differences between geometry of a current frame and geometry of a previous frame, in addition to applying the other techniques described herein. Decompression includes restoring the values for the current frame by applying the differences to the geometry of the previous frame.

In some examples, the compressed triangles 606 are part of a triangle strip. A triangle strip is a set of triangles where at least some of the triangles share vertices. To save space for a triangle strip, the BVH data compressor 503 defines each triangle as a set of vertex indices that index into a set of unique indices. The unique indices are compressed and decompressed as described herein. Triangles that share at least one vertex are defined with at least one identical index. By referring to triangle data by index, the amount of data stored is reduced as compared with a scheme in which all vertex data is stored for each vertex, regardless of whether vertices are identical. Decompression for triangles stored as strips includes restoring the vertex values for the triangles by identifying the compressed vertex data based on the indices, decompressing the compressed vertex data, thereby obtaining the final decompressed vertex values for the triangles.

Any entity of the device 100, such as the acceleration structure traversal stage 304, applies the decompression described herein. The compression and decompression schemes described can be applied to a variety of underlying data types, such as 32-bit floating point numbers, 16-bit floating point numbers, or other data types.

The present disclosure contemplates use of any combination of compression techniques described herein.

Figure 8:
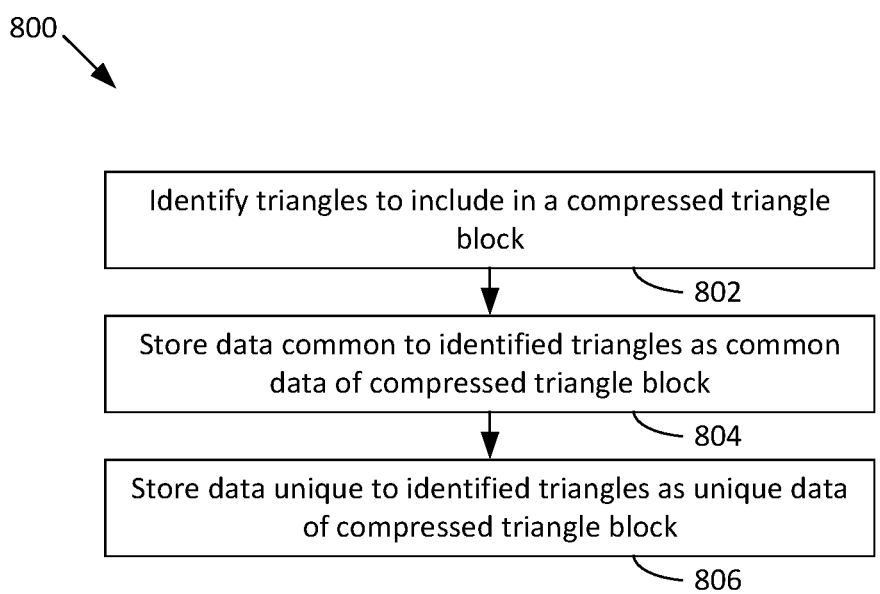
FIG. 8 is a flow diagram of a method for compressing triangles for a BVH, according to an example.

FIG. 8 is a flow diagram of a method 800 for compressing triangles for a BVH, according to an example. Although described with respect to the systems of FIGS. 1-7, those of skill in the art will understand that any system, configured to perform the steps of the method 800 in any technically feasible order, falls within the scope of the present disclosure.

At step 802, a BVH data compressor 503 identifies a set of triangles 602 to include together into a compressed triangle block 608. A compressed triangle block 608 includes data for triangles 602 that are similar in at least some respects so that deduplication can occur for common data 702. In some examples, the triangles 602 that are identified in step 802 are contiguous in a list of triangles that is sorted by Morton codes or by some other factor. In some examples, the number of triangles 602 that are selected fits within a fixed amount of data when compressed.

At step 804, the BVH data compressor 503 stores data that is common to the identified triangles of the compressed triangle block as common data 702 for the compressed triangle block. Examples of common data have been described herein. Some such examples include common prefixes, common midfixes, a primitive ID base, and a geometry ID base. A common prefix is a prefix that is common for all coordinate components for a particular coordinate axis for the triangles of a compressed triangle block 608. In an example, all x values for all vertices within a compressed triangle block 608 have the same prefix. The BVH data compressor 503 stores this prefix in the common data 702 and does not store that information in the unique data 704. Other examples related to other types of common data 702 are described herein.

At step 806, the BVH data compressor 503 stores data that is unique to the identified triangles as unique data for the compressed triangle block 608. The unique data is data that is not common to the triangles of the compressed triangle block 608 and thus is not stored in the common data 702. In the common prefix technique, the unique data is data other than the common prefixes. In an example, the unique data is data subsequent to the prefixes (i.e., the unique data includes less significant bits than the most significant bits defining the prefix). In some examples, each item of triangle unique data 706 in the unique data 704 of a compressed triangle block 606 includes unique values for x, y, and z axes of the vertices of a triangle. In examples where the trailing zero deduplication technique is used, the unique data includes a number of zeroes in the least significant bits. In examples where the separate compression of geometry ID and primitive ID is used, the unique data 704 stores the offset from the base geometry ID and the offset from the base primitive ID, for each triangle.

It should be understood that for information stored as common data, the benefit is that the amount of data represented by that common data is reduced in the compressed triangle block 606 as compared with a scheme in which that common data were stored one time for each triangle.

Subsequent to compressing the triangles, an entity such as the acceleration structure traversal stage 304 decompresses the triangle data to reconstruct triangles and performs operations with those triangles, such as testing the triangles for intersection with rays as described elsewhere herein. Such decompression depends on the combination of compression techniques used and is described elsewhere herein. Regarding common prefixes or midfixes, a decompressor reconstitutes a coordinate axis value for a vertex by combining the common prefix and/or midfix with other portions of that value derived from the common data and the unique data. Regarding trailing zeroes, a decompressor reconstitutes a coordinate axis value for a vertex by generating the indicated number of zeroes with other portions of that value derived from the common data and the unique data. Regarding the separate compression of geometry ID and primitive ID, the decompressor increments the base value for a geometry ID or primitive ID by the offset stored for the triangle.

In some examples, decompression is applied after the method 800. In an example, after geometry in a scene changes, the BVH data compressor 503 compresses the triangles and a BVH builder builds a BVH if not already built. During ray tracing operations including testing rays against triangles, the ray tracing pipeline 300 traverses the BVH to arrive at compressed triangles 606. The ray tracing pipeline 300 decompresses the compressed triangles 606 as described herein to test rays for intersection with the triangles.

Each of the units illustrated in the figures represent hardware circuitry configured to perform the operations described herein, software configured to perform the operations described herein, or a combination of software and hardware configured to perform the steps described herein. For example, the ray tracing pipeline 300, ray generation shader 302, any hit shader 306, hit or miss unit 308, miss shader 312, closest hit shader 310, and acceleration structure traversal stage 304 are implemented fully in hardware, fully in software executing on processing units (such as compute units 132), or as a combination thereof. In some examples, the acceleration structure traversal stage 304 is partially implemented as hardware and partially as software. In some examples, the portion of the acceleration structure traversal stage 304 that traverses the bounding volume hierarchy is software executing on a processor and the portion of the acceleration structure traversal stage 304 that performs the ray-box intersection tests and ray-triangle intersection tests is implemented in hardware.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing ray tracing operations, the method comprising:

identifying triangles to include in a compressed triangle block;

storing data common to the identified triangles as common data of the compressed triangle block, wherein the common data includes common prefixes that form an initial portion of coordinate values of vertices of the identified triangles and an indication, for each coordinate value, of whether to increment the common prefix during decompression; and storing data unique to the identified triangles as unique data of the compressed triangle block.

2. The method of claim 1, wherein identifying the triangles includes identifying triangles that, when compressed, occupy less space than a maximum amount of space for a compressed triangle block.

3. The method of claim 1, wherein a box node of a bounding volume hierarchy references triangles in multiple compressed triangle blocks.

4. The method of claim 1, wherein the common data includes a plurality of prefixes and a selection of one of the plurality of prefixes for each of the identified triangles.

5. The method of claim 1, wherein the data unique to the identified triangles includes a value indicating a number of trailing zeroes, a primitive identifier offset, and a geometry identifier offset.

6. The method of claim 1, wherein the common data includes a base primitive identifier and a base geometry identifier and the unique data includes a primitive offset and a geometry offset.

7. The method of claim 6, further comprising:

decompressing the compressed triangle block to generate a decompressed triangle; and testing a ray for intersection against the decompressed triangle.

8. The method of claim 1, wherein the compressed triangle block includes data for two triangles that share at least one vertex, and each triangle of the two triangles includes a set of indices that reference vertex data.

9. The method of claim 1, wherein the triangles in the compressed triangle block are consecutive triangles in a list of sorted triangles for a scene.

10. A system for performing ray tracing operations, the system comprising:

a memory configured to store compressed data; and a processor configured to perform operations for compression of a bounding volume hierarchy, the operations including:

identifying triangles to include in a compressed triangle block for storage in the memory;

storing data common to the identified triangles as common data of the compressed triangle block, wherein the common data includes common prefixes that form an initial portion of coordinate values of vertices of the identified triangles and an indication, for each coordinate value, of whether to increment the common prefix during decompression; and storing data unique to the identified triangles as unique data of the compressed triangle block.

11. The system of claim 10, wherein identifying the triangles includes identifying triangles that, when compressed, occupy less space than a maximum amount of space for a compressed triangle block.

12. The system of claim 10, wherein a box node of a bounding volume hierarchy references triangles in multiple compressed triangle blocks.

13. The system of claim 10, wherein the common data includes a plurality of prefixes and a selection of one of the plurality of prefixes for each of the identified triangles.

14. The system of claim 10, wherein the data unique to the identified triangles includes a value indicating a number of trailing zeroes, a primitive identifier offset, and a geometry identifier offset.

15. The system of claim 10, wherein the common data includes a base primitive identifier and a base geometry identifier and the unique data includes a primitive offset and a geometry offset.

16. The system of claim 15, wherein the operations further include decompressing the compressed triangle block to generate a decompressed triangle; and testing a ray for intersection against the decompressed triangle.

17. The system of claim 10, wherein the compressed triangle block includes data for two triangles that share at least one vertex, and each triangle of the two triangles includes a set of indices that reference vertex data.

18. The system of claim 10, wherein the triangles in the compressed triangle block are consecutive triangles in a list of sorted triangles for a scene.

19. A non-transitory computer-readable medium storing instructions that, when executed by a processor, cause the processor to perform operations comprising:

identifying triangles to include in a compressed triangle block for storage in a memory;

storing data common to the identified triangles as common data of the compressed triangle block, wherein the common data includes common prefixes that form an initial portion of coordinate values of vertices of the identified triangles and an indication, for each coordinate value, of whether to increment the common prefix during decompression; and storing data unique to the identified triangles as unique data of the compressed triangle block.

20. The non-transitory computer-readable medium of claim 19, wherein identifying the triangles includes identifying triangles that, when compressed, occupy less space than a maximum amount of space for a compressed triangle block.

* * * * *